United States Patent
Bliley et al.

(10) Patent No.: US 10,926,555 B2
(45) Date of Patent: Feb. 23, 2021

(54) SWITCH AND RESISTOR ARRAY FOR DETECTING PAPER TRAY DIMENSIONS

(71) Applicant: Hewlett-Packard Development Company, L.P., Spring, TX (US)

(72) Inventors: Paul D Bliley, Vancouver, WA (US); Tyler Phillip Kapp, Vancouver, WA (US); Michael Walters, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/332,098

(22) PCT Filed: Sep. 12, 2016

(86) PCT No.: PCT/US2016/051236
§ 371 (c)(1),
(2) Date: Mar. 11, 2019

(87) PCT Pub. No.: WO2018/048433
PCT Pub. Date: Mar. 15, 2018

(65) Prior Publication Data
US 2019/0358967 A1    Nov. 28, 2019

(51) Int. Cl.
*B41J 11/00* (2006.01)
*B65H 1/04* (2006.01)
(52) U.S. Cl.
CPC .............. *B41J 11/003* (2013.01); *B65H 1/04* (2013.01); *B65H 2511/10* (2013.01); *B65H 2511/20* (2013.01); *B65H 2553/21* (2013.01)

(58) Field of Classification Search
CPC ............... B65H 2511/416; B65H 1/04; B65H 2511/10; B65H 2511/20; B65H 2553/21; B41J 11/485; B41J 11/003; B41J 29/393
See application file for complete search history.

(56) References Cited

U.S. PATENT DOCUMENTS

| | | |
|---|---|---|
| 5,305,020 A | 4/1994 | Gibbons et al. |
| 5,333,852 A | 8/1994 | Milillo et al. |
| 6,267,522 B1 | 7/2001 | Slippy et al. |
| 7,285,965 B2 | 10/2007 | Shen |

(Continued)

OTHER PUBLICATIONS

HP Color Laserjet 3000, 3600 and 3800 Series Printers—Configuring Trays, Sep. 15, 2008, < http://h20564.www2.hp.com/ ~ 18 pages.

*Primary Examiner* — Jannelle M Lebron
(74) *Attorney, Agent, or Firm* — Tong Rea Bentley & Kim LLC (57) ABSTRACT

In one example, an apparatus includes a first switch array including a first plurality of switches. A first resistor array includes a first plurality of resistor pairs, where each resistor pair in the first plurality of resistors is coupled to one switch of the first plurality of switches. The apparatus also includes a second switch array including a second plurality of switches. A second resistor array includes a second plurality of resistor pairs, where each resistor pair in the second plurality of resistors is coupled to one switch of the second plurality of switches. The apparatus further includes a plurality of output nodes configured to transmit an analog voltage, where each output node of the plurality of output nodes is connected to one resistor pair of the first resistor array and one resistor pair of the second resistor array.

17 Claims, 4 Drawing Sheets

(56) References Cited

U.S. PATENT DOCUMENTS

| | | |
|---|---|---|
| 7,540,677 B2 | 6/2009 | Allwright |
| 7,694,960 B2 | 4/2010 | Sing |
| 8,123,213 B2 | 2/2012 | Bridges et al. |
| 8,807,557 B2 | 8/2014 | Lu et al. |
| 2001/0043830 A1 | 11/2001 | Higuchi |
| 2006/0072139 A1 | 4/2006 | Hult et al. |
| 2007/0127966 A1 | 6/2007 | Naito |

SWITCH AND RESISTOR ARRAY FOR DETECTING PAPER TRAY DIMENSIONS

BACKGROUND

Printing devices, including laser printers and inkjet printers, create persistent images on substrates (e.g., sheets of paper) by applying printing fluid (e.g., ink, toner, or the like) to the substrates. Many of these printing devices include trays into which a finite number of substrates can be loaded. When an image is to be printed, the substrates may be fed, one at a time, from the tray into the printing path. The tray may be reloaded when its supply of substrates runs low or runs out.

DETAILED DESCRIPTION

In one example, the present disclosure describes a switch and resistor array that detects the length and width settings of an adjustable paper tray of a printing device. As discussed above, many printing devices include trays into which a finite number of substrates (e.g., sheets of paper) can be loaded. When an image is to be printed, the substrates may be fed, one at a time, from the tray into the printing path. Since substrates can come in a variety of sizes (e.g., letter size, A4, etc.), the trays are sometimes adjustable so that various substrate sizes can be accommodated by the same tray. For instance, if a user wishes to load substrates having particular dimensions into a tray, he or she may manually adjust the dimensions of the tray to fit the substrates, thereby facilitating smooth feeding of the substrates into the printing path. When the printing device is ready to print from a particular tray, it may inquire as to the size of the substrates in that tray so that it can format the image to be printed to fit the substrate. However, a user may not know, offhand, what the dimensions of the substrates that are loaded into a particular tray are.

The present disclosure describes a switch and resistor array that can automatically detect the length and width settings of a paper tray in a printing device. In particular, the array of switches and resistors may provide a unique analog voltage which can be converted to a digital value by an analog-to-digital converter. A controller (e.g., a microcontroller or other processor) can then determine the length and width settings of the paper tray based on the digital value (e.g., using a lookup table or other data structure). Thus, the present disclosure makes use of available analog input pins in a controller to determine the paper tray's dimensions in an accurate, cost effective manner.

Although the term "paper tray" is used herein to refer to the portion of a printing device via which substrates are loaded for use in printing, this does not limit the disclosure to use with paper. For instance, the tray could be used to load other types of substrates on which images can be printed, including polymer sheets, textiles, and other non-paper substrates, without departing from the scope of the present disclosure.

Figure 1:
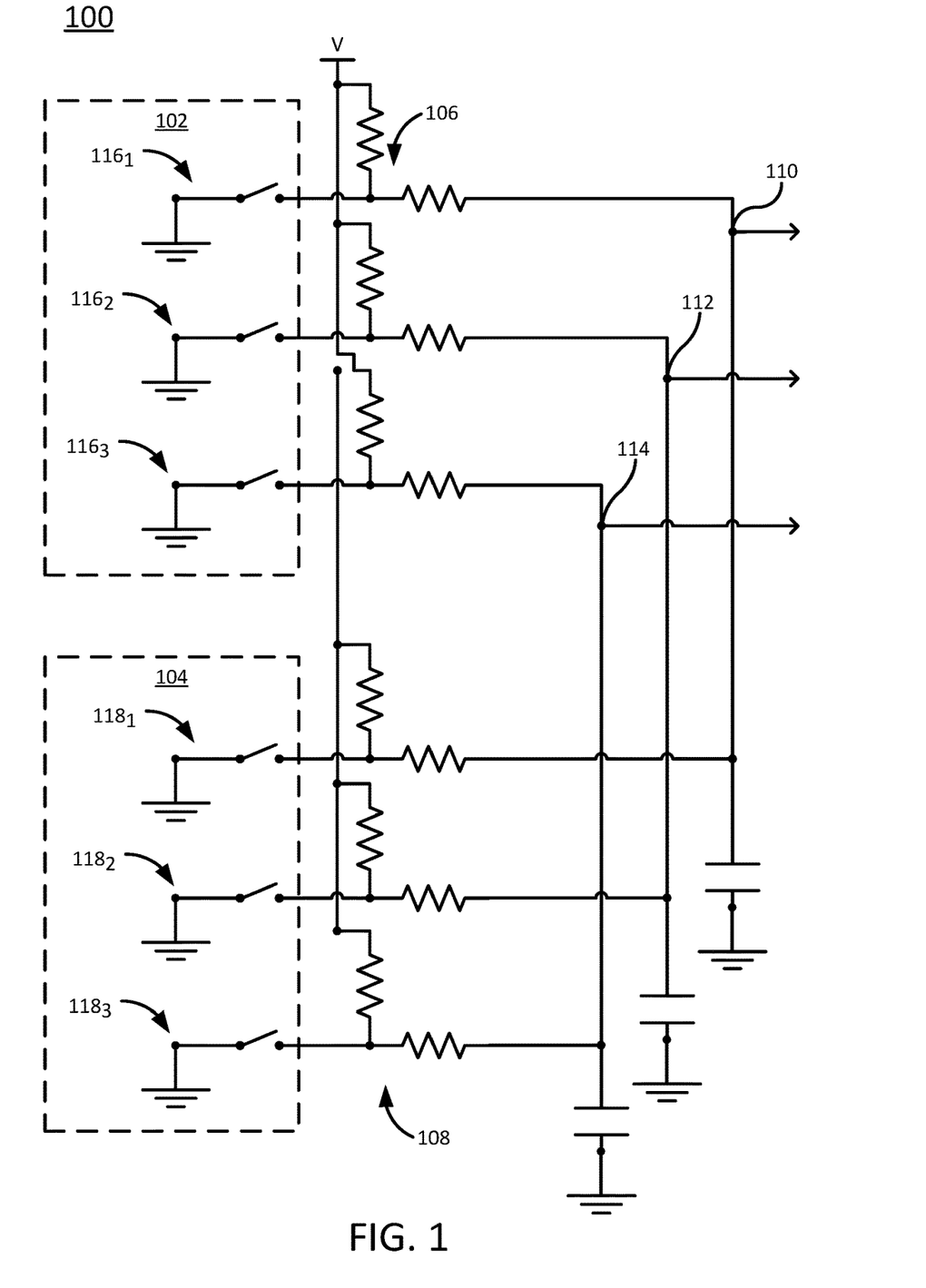
FIG. 1 illustrates an example of a portion of a circuit for detecting the dimensions of a paper tray of a printing device, according to the present disclosure.

FIG. 1 illustrates an example of a portion of a circuit 100 for detecting the dimensions of a paper tray of a printing device, according to the present disclosure. The circuit 100 may be deployed in or partially in a tray of a printing device, and may be further coupled to a plurality of (e.g., three) analog input pins of a controller of the printing device, such as a microcontroller implemented in application specific integrated circuits (ASIC). As illustrated, the circuit 100 generally comprises a first switch array 102, a second switch array 104, a first resistor array 106, a second resistor array 108, a first output node 110, a second output node 112, and a third output node 114.

In one example, the first switch array 102 is configured to detect the width of the paper tray. To this end, the first switch array 102 may comprise a plurality of switches $116_1$-$116_3$ (hereinafter collectively referred to as "switches 116"). In the illustrated example, three switches 116 are shown. In one example, each of the switches 116 is positioned in the paper tray at a different selectable location or setting along the width of the paper tray. When a user manually adjusts the width of the tray, the user may do so by moving a guide into one of a plurality of predefined positions. The guide may engage a mechanism (e.g., a tab, a catch, or the like) that retains the guide in place in a predefined position until the width is readjusted. Thus, each of the switches 116 may be positioned within the tray to correspond to one of the predefined positions to which the guide can be moved. In this way, when the guide is moved to one of the predefined positions, it will actuate the corresponding switch 116.

The first resistor array 106 comprises a parallel combination of resistors that collectively forms a voltage divider whose output voltage will be a fraction of the circuit's input voltage V (which may be, e.g., 3.3 volts). Each switch 116 in the first switch array 102 is electrically coupled to a pair of resistors in the first resistor array 106, such that actuation of one of the switches 116 in the first switch array 102 will cause different resistors of the first resistor array 106 to be put in parallel or not in parallel. The values of the individual resistors in the first resistor array 106 are chosen so that each pair of resistors divides the input voltage V by a different fraction. Thus, the output voltage of the first resistor array 106 will vary depending on which switch 116 is actuated. For instance, if the switch $116_1$ is actuated, this may cause an analog voltage to be transmitted on the first output node 110 of the circuit 100; if the switch $116_2$ is actuated, this may cause an analog voltage to be transmitted on the second output node 112 of the circuit 100; and if the switch $116_3$ is actuated, this may cause an analog voltage to be transmitted on the third output node 114 of the circuit 100.

In one example, the second switch array 104 is configured to detect the length of the paper tray. To this end, the second switch array 104 may comprise a plurality of switches $118_1$-$118_3$ (hereinafter collectively referred to as "switches 118"). In the illustrated example, three switches 118 are shown. In one example, each of the switches 118 is positioned in the paper tray at a different selectable location or setting along the length of the paper tray (which may be orthogonal to the width of the paper tray). When a user manually adjusts the length of the tray, the user may do so by moving a guide into one of a plurality of predefined positions. The guide may engage a mechanism (e.g., a tab, a catch, or the like) that retains the guide in place in a predefined position until the length is readjusted. Thus, each of the switches 118 may be positioned within the tray to correspond to one of the predefined positions to which the guide can be moved. In this way, when the guide is moved to one of the predefined positions, it will actuate the corresponding switch 118.

The second resistor array 108 comprises a parallel combination of resistors that collectively forms a voltage divider whose output voltage will be a fraction of the circuit's input voltage V (which may be, e.g., 3.3 volts). Each switch 118 in the second switch array 104 is electrically coupled to a pair of resistors in the second resistor array 108, such that actuation of one of the switches 118 in the second switch array 104 will cause different resistors of the second resistor array 108 to be put in parallel or not in parallel. The values of the individual resistors in the second resistor array 108 are chosen so that each pair of resistors divides the input voltage V by a different fraction. Thus, the output voltage of the second resistor array 108 will vary depending on which switch 118 is actuated. For instance, if the switch $118_1$ is actuated, this may cause an analog voltage to be transmitted on the first output node 110 of the circuit 100; if the switch $118_2$ is actuated, this may cause an analog voltage to be transmitted on the second output node 112 of the circuit 100; and if the switch $118_3$ is actuated, this may cause an analog voltage to be transmitted on the third output node 114 of the circuit 100.

Each of the first output node 110, the second output node 112, and the third output node 114 is electrically coupled to a pair of resistors in the first resistor array 106 and a pair of resistors in the second resistor array 108. Each output node 110, 112, or 114 receives a signal from each coupled pair of resistors indicating whether the coupled pair of resistors is in parallel or not in parallel (which, as discussed above, will result from the corresponding switch 116 or 118 being off or on). In one example, the signal is a binary signal (e.g., 0 for not in parallel, 1 for in parallel). Thus, each output node 110, 112, or 114 will receive two signals: a first signal from the first resistor array 106 (e.g., indicating the width of the paper tray) and a second signal from the second resistor array 108 (e.g., indicating the length of the paper tray). Each combination of signals will, in turn, produce a different output voltage on the corresponding output node 110, 112, or 114. Table 1, for instance, illustrates an example of analog voltage signals that may be produced in response to different combinations of binary (e.g., zero and one) signal values from the resistors of the first resistor array 106 and the resistors of the second resistor array 108.

TABLE 1

| Width bit | Length bit | Analog Voltage |
|---|---|---|
| 0 | 0 | 0.0 V |
| 0 | 1 | 1.94 V |
| 1 | 0 | 0.97 V |
| 1 | 1 | 3.3 V |

In one example, a value of 0 indicates that a particular switch 116 or 118 coupled to an output node 110, 122, 114 via a pair of resistors is off, while a value of 1 indicates that the particular switch is on. In one example, the resulting analog voltages for each combination of binary signals are set with a large enough difference between values (e.g., approximately 0.97 volts in the example of Table 1) that minor variations in the analog voltage signals can be accommodated in the subsequent analog-to-digital conversion without compromising the accuracy of the disclosure. The differences between the analog voltages may be evenly spaced within the range of analog voltages.

Figure 2:
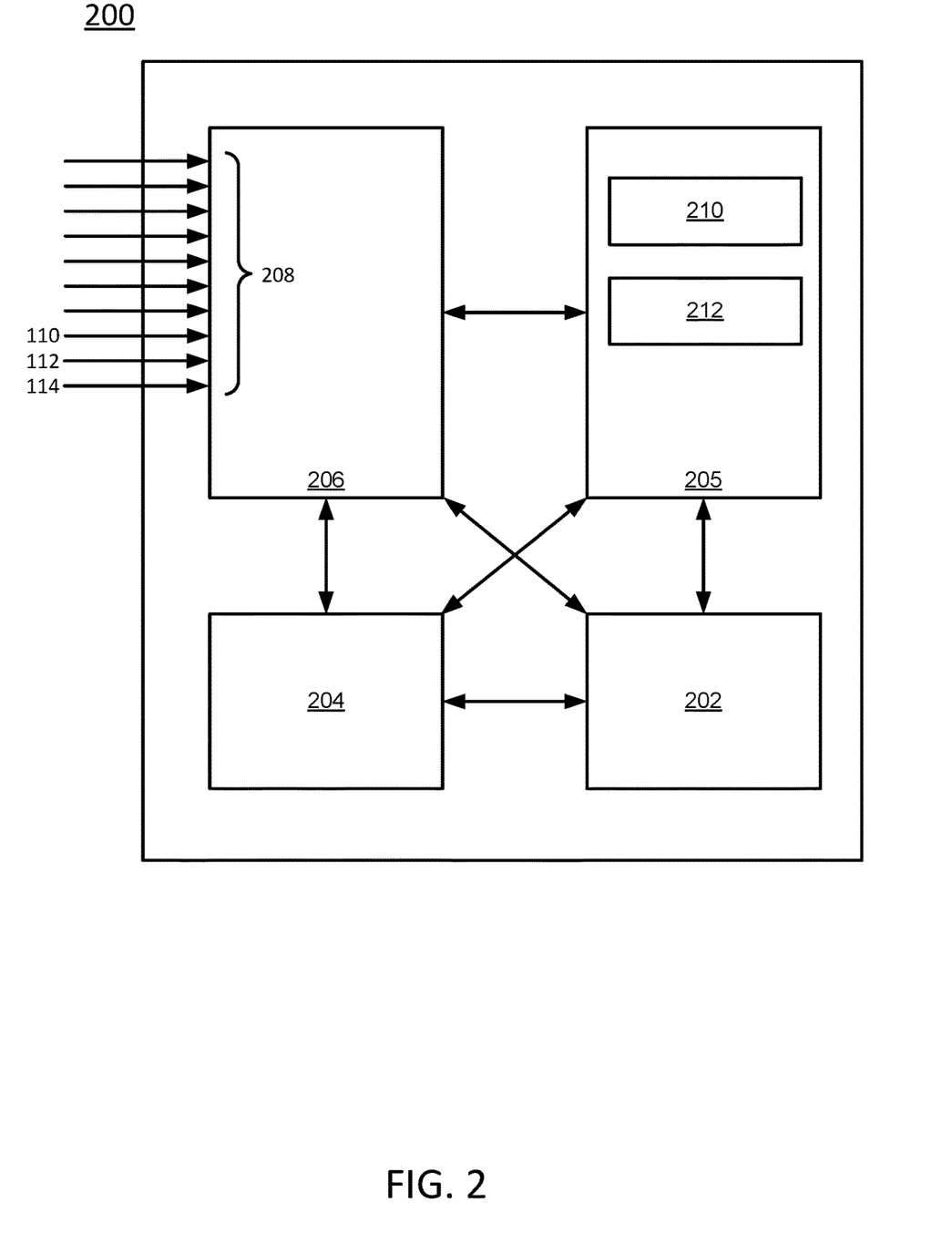
FIG. 2 depicts a high-level block diagram of an example of a controller that may be configured for detecting the dimensions of a paper tray of a printing device, as disclosed herein.

Each of the first output node 110, the second output node 112, and the third output node 114 is also electrically coupled to a respective analog input pin of a controller of the printing device. An example controller is illustrated in FIG. 2. The controller may perform analog-to-digital conversion of the analog voltage signals provided by the output nodes 110, 112, 114 in order to detect the dimensions of the paper tray, as discussed in further detail below.

FIG. 2 depicts a high-level block diagram of an example of a controller 200 that may be configured for detecting the dimensions of a paper tray of a printing device, as disclosed herein. The controller 200 may be configured to receive analog voltage signals from the circuit 100 of FIG. 1 and to convert those analog voltage signals to digital values from which dimensions of a paper tray of a printing device can be determined.

As depicted in FIG. 2, the controller 200 may comprise a hardware processor element 202, e.g., a central processing unit (CPU), a microprocessor, or a multi-core processor, a memory 204, e.g., random access memory (RAM), a module 205 for detecting the dimensions of a paper tray, and various input/output devices 606, e.g., storage devices, including but not limited to, a tape drive, a floppy drive, a hard disk drive or a compact disk drive, a receiver, a transmitter, a speaker, a display, a speech synthesizer, an output port, an input port and a user input device, such as a keyboard, a keypad, a mouse, a microphone, and the like. In the illustrated example, the I/O devices 206 include a plurality of input pins 208. In one example, some of the input pins 208 are configured to receive digital signal inputs, while others of the input pins 208 are configured to receive analog signal inputs. For instance, some of the input pins 208 are configured to receive analog signal inputs from the output nodes 110, 112, and 114 of the circuit 100.

Although one processor element 202 is shown, it should be noted that the controller 200 may employ a plurality of processor elements. Furthermore, although one controller 200 is shown in the figure, if the method(s) as discussed below are implemented in a distributed or parallel manner for a particular illustrative example, i.e., the blocks of the below method(s) or the entire method(s) are implemented across multiple or parallel controllers, then the controller 200 of this figure is intended to represent each of those multiple controllers.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed below can be used to configure a hardware processor to perform the blocks, functions and/or operations of the below disclosed methods.

Figure 3:
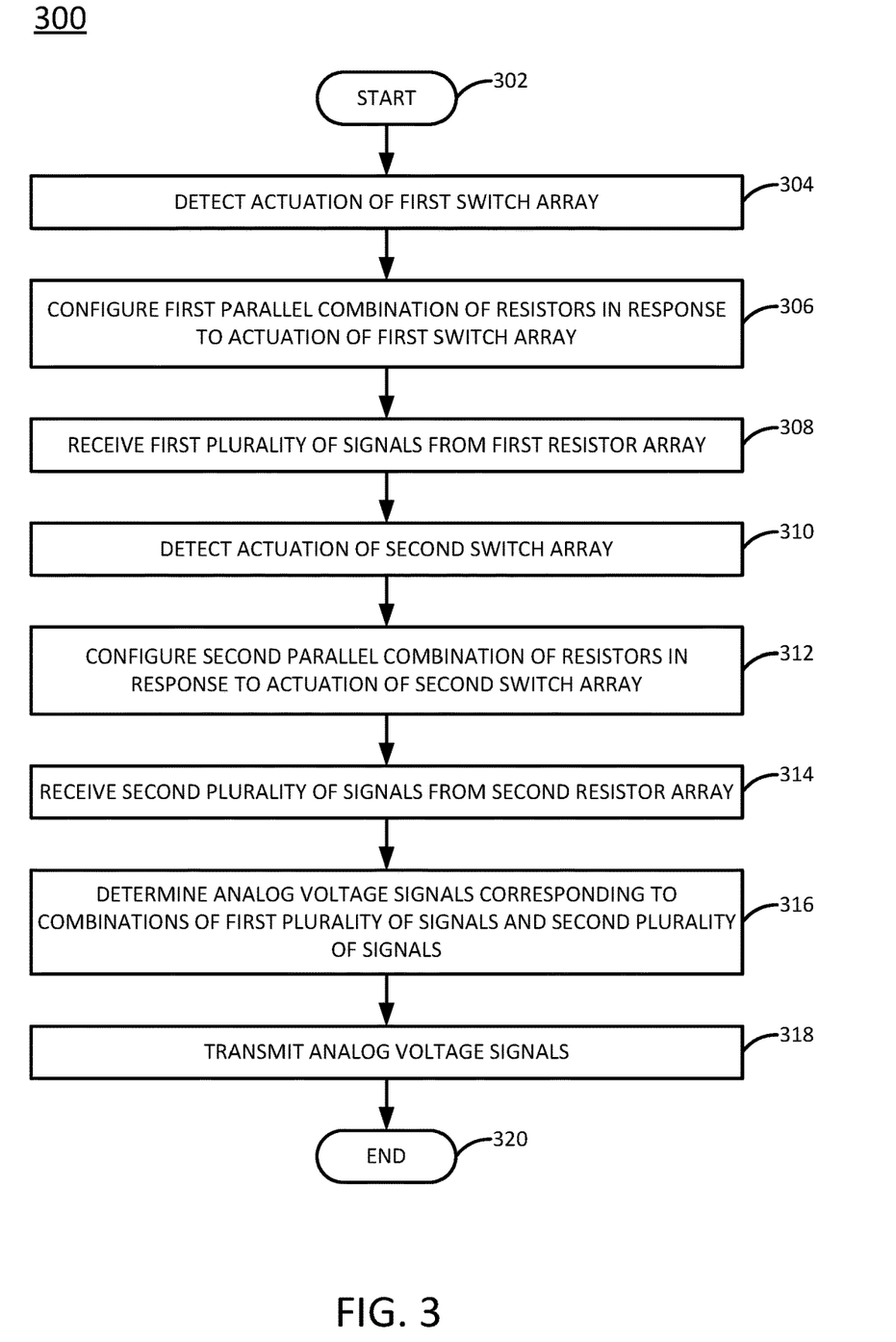
FIG. 3 illustrates a flowchart of a first example method for detecting the dimensions of a paper tray of a printing device.
Figure 4:
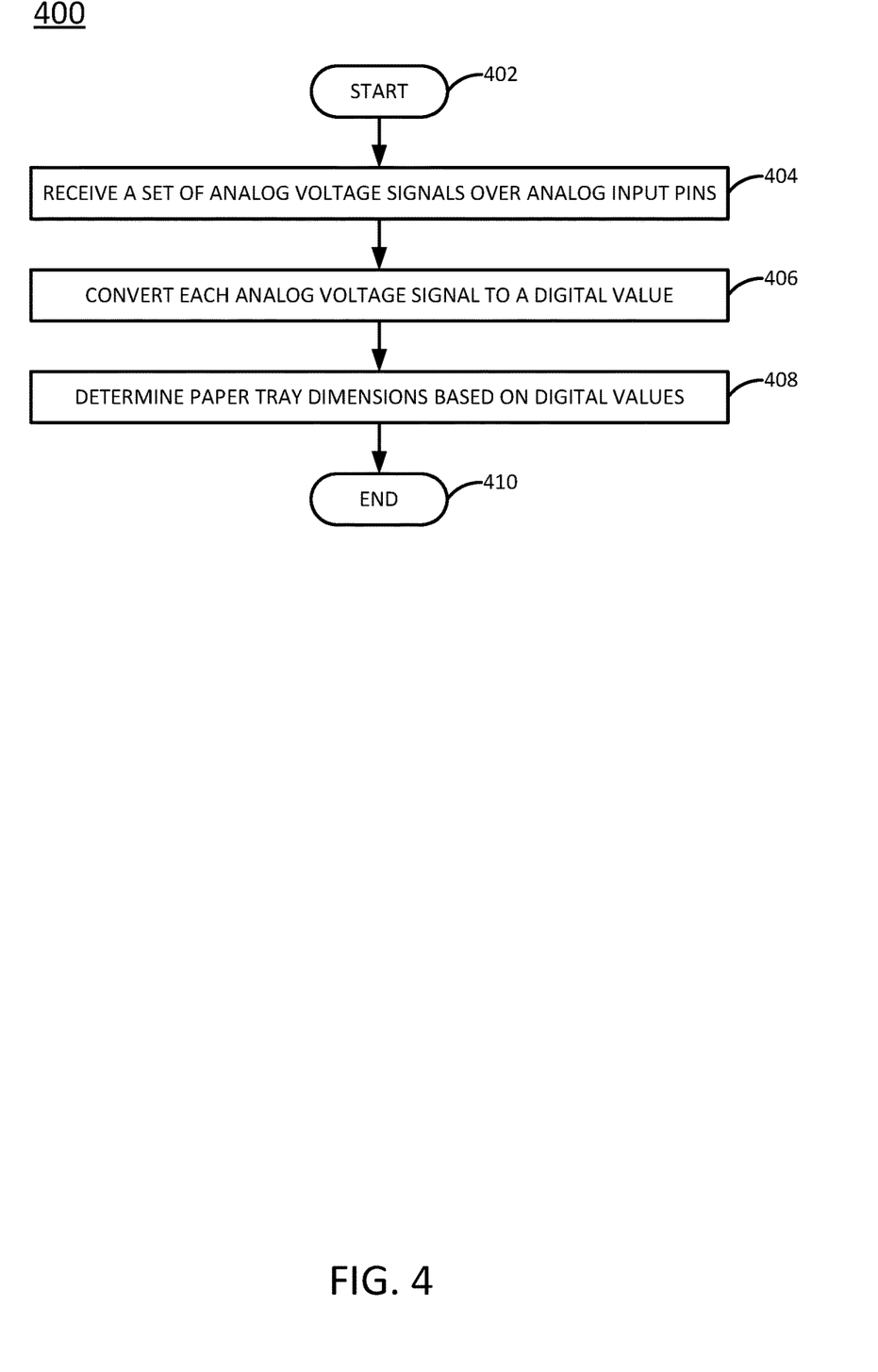
FIG. 4 illustrates a flowchart of a second example method for detecting the dimensions of a paper tray of a printing device.

In one example, instructions and data for the present module or process 205 for detecting the dimensions of a paper tray, e.g., machine readable instructions, can be loaded into memory 204 and executed by hardware processor element 202 to implement the blocks, functions, or operations as discussed below in connection with the example methods 300 and 400. In this case, the module 205 for detecting the dimensions of a paper tray may include code components or instructions, including instructions 210 and 212 for performing analog-to-digital conversion of analog signal inputs and performing a lookup of tray dimensions using the resultant digital values. Furthermore, when a hardware processor executes instructions to perform "operations," this could include the hardware processor performing the operations directly and/or facilitating, directing, or cooperating with another hardware device or component, e.g., a co-processor and the like, to perform the operations.

The processor executing the machine readable instructions relating to the below described method(s) can be perceived as a programmed processor or a specialized processor. As such, the present module 205 for detecting the dimensions of a paper tray, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, the computer-readable storage device may comprise any physical device or devices that provide the ability to store information such as data and/or instructions to be accessed by a processor or a computing device such as a controller, a computer, or an application server.

FIG. 3 illustrates a flowchart of a first example method 300 for detecting the dimensions of a paper tray of a printing device. The method 300 may be performed, for example, by the circuit 100 of FIG. 1. As such, non-limiting reference is made in the discussion of the method 300 to various components of FIG. 1.

The method 300 begins in block 302. In block 304, actuation of the first switch array 102 is detected. In one example, actuation of the first switch array 102 involves actuation of at least one of the switches 116 of the first switch array 102. The switch 116 may be actuated when a user adjusts a guide of the paper tray such that the guide engages a mechanism that retains the guide in place in a predefined position. Thus, the switch 116 may be positioned in the paper tray so that it is actuated when the guide engages the mechanism.

In block 306, a first parallel combination of resistors is configured in response to the actuation of the first switch array 102. As discussed above, each switch 116 in the first switch array 102 is electrically coupled to a pair of resistors in the first resistor array 106, such that actuation of one of the switches 116 in the first switch array 102 will cause different resistors of the first resistor array 106 to be put in parallel or not in parallel.

In block 308, a first plurality of signals is generated by the first resistor array 106 and received by the output nodes 110, 112, and 114. As discussed above, each output node 110, 112, or 114 may receive a binary signal (e.g., 0 or 1) indicating whether the switch 116 to which the output node 110, 112, or 114 is coupled (via a respective resistor pair) is on or off.

In block 310, actuation of the second switch array 104 is detected. In one example, actuation of the second switch array 104 involves actuation of at least one of the switches 118 of the second switch array 104. The switch 118 may be actuated when a user adjusts a guide of the paper tray such that the guide engages a mechanism that retains the guide in place in a predefined position. Thus, the switch 118 may be positioned in the paper tray so that it is activated when the guide engages the mechanism.

In block 312, a second parallel combination of resistors is configured in response to the actuation of the second switch array 104. As discussed above, each switch 118 in the second switch array 104 is electrically coupled to a pair of resistors in the second resistor array 108, such that actuation of one of the switches 118 in the second switch array 104 will cause different resistors of the second resistor array 108 to be put in parallel or not in parallel.

In block 314, a second plurality of signals is generated by the second resistor array 108 and received by the output nodes 110, 112, and. As discussed above, each output node 110, 112, or 114 may receive a binary signal (e.g., 0 or 1) indicating whether the switch 118 to which the output node 110, 112, or 114 is coupled (via a respective resistor pair) is on or off.

In block 316, each output node 110, 112, and 114 determines an analog voltage signal corresponding to the combination of signals the output node 110, 112, or 114 received in the first plurality of signals (e.g., block 308) and the second plurality of signals (e.g., block 314). For instance, the corresponding analog voltage signal may be determined in conjunction with Table 1, above.

In block 318, each output node 110, 112, or 114 transmits (e.g., to the analog input pins of the controller 200) its respectively determined analog voltage signal.

The method 300 ends in block 320.

FIG. 4 illustrates a flowchart of a second example method 400 for detecting the dimensions of a paper tray of a printing device. The method 400 may be performed, for example, by the controller 200 of FIG. 2. Alternatively, or in addition, at least one of the blocks of the method 400 may be implemented by a computing device having a processor, a memory, and input/output devices similar to those illustrated in FIG. 2, specifically programmed to perform the blocks of the method, e.g., by operating as a control circuit for the printing device. Although a computing device may be specifically programmed to perform various blocks of the method 400, the method will now be described in terms of an example where blocks of the method are performed by a controller of a printing device, such as the controller 200 of FIG. 2. As such, non-limiting reference is made in the discussion of the method 400 to various components of FIG. 2.

The method 400 begins in block 402. In block 404, a set of analog voltage signals is received over the analog input pins of the controller 200. The set of analog voltage signals may be transmitted, for example, via the output nodes 110, 112, or 114 of the circuit 100.

In block 406, each analog voltage signal is converted to a digital value, e.g., using an analog-to-digital converter or code components or instructions for performing the conversion.

In block 408, the dimensions of the paper tray (e.g., width and length) are determined based on the digital values. For instance, in one example, the dimensions may be determined by looking up the digital values in a lookup table (or other data structure) to determine corresponding dimensions. In another example, the digital values may be input into a hash function to determine the paper tray dimensions. In any case, the unique digital values that are produced in block 406 will allow the controller 200 to distinctly identify the current settings of the paper tray.

The method 400 ends in block 410.

It will be appreciated that variants of the above-disclosed and other features and functions, or alternatives thereof, may be combined into many other different systems or applications. Various presently unforeseen or unanticipated alternatives, modifications, or variations therein may be subsequently made, which are also intended to be encompassed by the following claims.

What is claimed is:

1. An apparatus, comprising:
a first switch array comprising a first plurality of switches;
a first resistor array comprising a first plurality of resistor pairs, where each resistor pair in the first plurality of resistors is coupled to one switch of the first plurality of switches, wherein the each resistor pair in the first plurality of resistors is electrically coupled to the one switch of the first plurality of switches in a manner such that actuation of the one switch of the first plurality of switches causes the each resistor pair in the first plurality of resistors to be put in one state selected from a group of: parallel and not parallel;
a second switch array comprising a second plurality of switches;
a second resistor array comprising a second plurality of resistor pairs, where each resistor pair in the second plurality of resistors is coupled to one switch of the second plurality of switches, wherein the each resistor pair in the second plurality of resistors is electrically coupled to the one switch of the second plurality of switches in a manner such that actuation of the one switch of the second plurality of switches causes the each resistor pair in the second plurality of resistors to be put in one state selected from a group of: parallel and not parallel; and
a plurality of output nodes, where each output node of the plurality of output nodes is connected to one resistor pair of the first resistor array, one resistor pair of the second resistor array, and one analog input pin of a controller of a printing device.

2. The apparatus of claim 1, wherein the apparatus is a paper tray of the printing device, each switch of the first plurality of switches is positioned in the paper tray at a different location along a width of the paper tray, and each switch of the second plurality of switches is positioned in the paper tray at a different location along a length of the paper tray that is orthogonal to the width.

3. The apparatus of claim 1, wherein each resistor pair of the first resistor array is configured to transmit a first binary signal to one output node of the plurality of output nodes, and each resistor pair in second resistor array is configured to transmit a second binary signal to one output node of the plurality of output nodes.

4. The apparatus of claim 3, wherein each output node of the plurality of output nodes is configured to generate an analog voltage signal in response to a combination of values indicated in the first binary signal and the second binary signal.

5. The apparatus of claim 4, wherein the analog voltage signal indicates an analog voltage in a range of evenly spaced analog voltages.

6. A method, comprising:
configuring a first parallel combination of resistors in response to an actuation of a first switch positioned in a paper tray of a printing device, wherein the first parallel combination of resistors is electrically coupled to the first switch in a manner such that actuation of the first switch causes the first parallel combination of resistors to be put in a first state selected from a group of: parallel and not parallel;
generating a first plurality of signals from a first resistor array including the first parallel combination of resistors, based in part on the first state;
configuring a second parallel combination of resistors in response to an actuation of a second switch positioned in the paper tray of the printing device, wherein the second parallel combination of resistors is electrically coupled to the second switch in a manner such that actuation of the second switch causes the second parallel combination of resistors to be put in a second state selected from a group of: parallel and not parallel;
generating a second plurality of signals from a second resistor array including the second parallel combination of resistors, based in part on the second state; and
determining a plurality of analog voltage signals corresponding to combinations of the first plurality of signals and the second plurality of signals.

7. The method of claim 6, further comprising:
transmitting the plurality of analog voltage signals to analog input pins of a controller of the printing device.

8. The method of claim 6, wherein a width of the paper tray is variable among a plurality of selectable settings, and the first switch is positioned in the paper tray at one setting of the plurality of selectable settings.

9. The method of claim 6, wherein a length of the paper tray is variable among a plurality of selectable settings, and the second switch is positioned in the paper tray at one setting of the plurality of selectable settings.

10. The method of claim 6, wherein each signal of the first plurality of signals and each signal of the second plurality of signals is a binary signal, and each combination of binary signals corresponds to a unique analog voltage signal in a range of analog voltage signals.

11. The method of claim 10, wherein each unique analog voltage signal in the range of analog voltage signals corresponds to a different length and width combination for a print media.

12. A non-transitory machine-readable storage medium encoded with instructions executable by a processor, the machine-readable storage medium comprising:
instructions to configure a first parallel combination of resistors in response to an actuation of a first switch positioned in a paper tray of a printing device, wherein the first parallel combination of resistors is electrically coupled to the first switch in a manner such that actuation of the first switch causes the first parallel combination of resistors to be put in a first state selected from a group of: parallel and not parallel;
instructions to generate a first plurality of signals from a first resistor array including the first parallel combination of resistors, based in part on the first state;
instructions to configure a second parallel combination of resistors in response to an actuation of a second switch positioned in the paper tray of the printing device wherein the second parallel combination of resistors is electrically coupled to the second switch in a manner such that actuation of the second switch causes the second parallel combination of resistors to be put in a second state selected from a group of: parallel and not parallel;
instructions to generate a second plurality of signals from a second resistor array including the second parallel combination of resistors, based in part on the second state; and
instructions to determine a plurality of analog voltage signals corresponding to combinations of the first plurality of signals and the second plurality of signals.

13. The non-transitory machine-readable storage medium of claim 12, further comprising:
instructions to transmit the plurality of analog voltage signals to analog input pins of a controller of the printing device.

14. The non-transitory machine-readable storage medium of claim 12, wherein a width of the paper tray is variable among a plurality of selectable settings, and the first switch is positioned in the paper tray at one setting of the plurality of selectable settings.

15. The non-transitory machine-readable storage medium of claim 12, wherein a length of the paper tray is variable among a plurality of selectable settings, and the second switch is positioned in the paper tray at one setting of the plurality of selectable settings.

16. The non-transitory machine-readable storage medium of claim 12, wherein each signal of the first plurality of signals and each signal of the second plurality of signals is a binary signal, and each combination of binary signals corresponds to a unique analog voltage signal in a range of analog voltage signals.

17. The non-transitory machine-readable storage medium of claim 16, wherein each unique analog voltage signal in the range of analog voltage signals corresponds to a different length and width combination for a print media.

* * * * *